Dec. 3, 1935. K. E. HOFAMMANN ET AL Re. 19,774
RAIL ANCHOR
Original Filed Dec. 18, 1930
FIG. I.
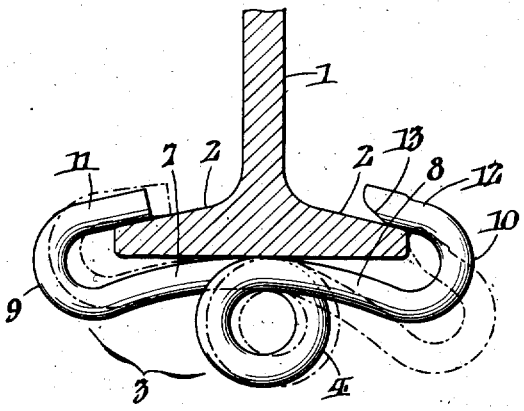
FIG. IV.
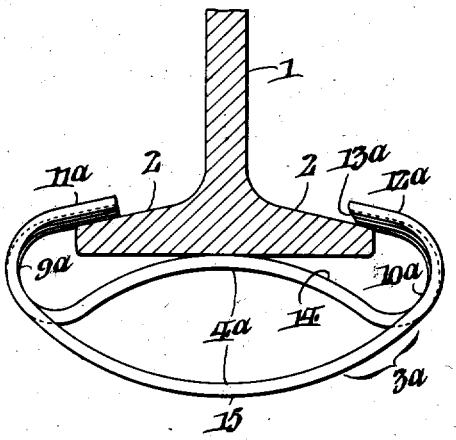
FIG. II.
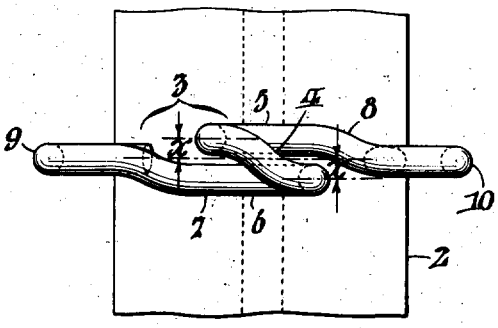
FIG. V.
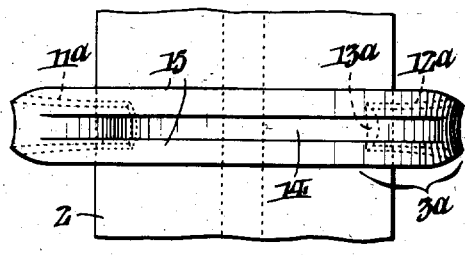
FIG. III.
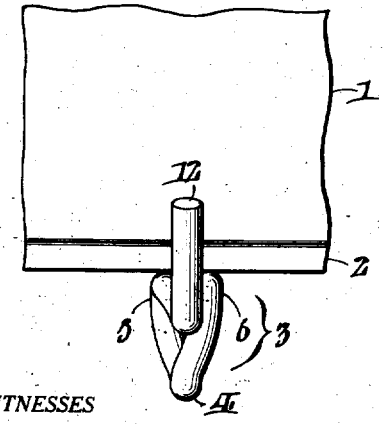
FIG. VI.
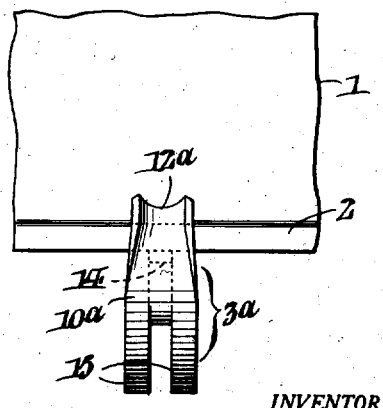
WITNESSES
John A. Weidler
Woodrow Stevenson
INVENTOR.
Karl E. Hofammann &
Louis H. Schlatter.
BY Fraley & Paul
ATTORNEY.

Reissued Dec. 3, 1935

Re. 19,774

UNITED STATES PATENT OFFICE 19,774

RAIL ANCHOR

Karl E. Hofammann and Louis H. Schlatter,
Altoona, Pa.

Original No. 1,889,316, dated November 29, 1932, Serial No. 503,126, December 18, 1930. Application for reissue November 24, 1934, Serial No. 754,683

17 Claims. (Cl. 238—330)

This invention relates to rail anchors and more particularly to rail anchors which possess sufficient inherent elasticity to permit their application to the base of a rail by a temporary deformation from normal shape and which, when applied to the rail, will be restrained against movement by a tightly sprung gripping action of their ends against the rail base.

The object of the invention is to provide a simple, inexpensive, and efficient rail anchor which may be easily applied to and removed from a rail without requiring special tools and which may be positioned in either direction with respect to the length of the rail. More specifically, the rail anchor of this invention is characterized by a positive snubbing action on the rail base incident to tie loading compression, this snubbing action augmenting the normal spring gripping of the anchor to the base of the rail.

Other objects and advantages characterizing the invention are more fully set forth in the description hereinafter of several embodiments or forms which the invention may take, the description having reference to the accompanying drawing, whereof:

Fig. I is a side view in elevation showing a rail anchor of our invention applied to the base flange of a rail, and showing also in dotted lines the initial position assumed by the anchor during the process of applying it to the rail.

Fig. II is a bottom plan view of the same.

Fig. III is an end view of the same.

Fig. IV is a side view in elevation showing a modified form of rail anchor having substantially the same characteristics as that shown in Figs. I, II and III, but manufactured in a different manner.

Fig. V is a bottom plan view of the same; and

Fig. IV is an end view of the same.

With particular reference to Figs. I, II and III, there is shown a portion of a standard rail at 1, having the usual form of bottom flange or base 2. The rail anchor 3 comprises a one-piece bar, preferably made of heat treated steel, and having sufficient inherent elasticity to afford the proper resistance to bending. In the example selected for illustration, the bar is circular in cross-section, though a bar of square, rectangular, or other shaped section may obviously be used for the same purpose by providing the proper shaped contacting points with the rail. Intermediate the ends of the bar is a loop 4 which, when formed as herein shown by crossing the ends of the bar, is termed a "closed loop". The loop 4 serves as a spring and extends downward in a direction substantially transverse to the longitudinal axis of the rail. Obviously the loop may be in the form of a circular helix, or it may be elliptical, or it may assume other shapes. The upper portions 5 and 6 of the loop are in contact with the base of the rail preferably near the central portion thereof and they constitute the inner ends of bow spring elements 7 and 8 which extend outward in opposite directions transverse of the longitudinal axis of the rail.

The two opposed bow spring elements 7 and 8 curve away from each other in an outward and downward direction and merge into comparatively long semi-circular end hooks 9 and 10 which curve around the edges of the rail base with considerable clearance and terminate in straight gib ends 11 and 12 which coincide with the top slopes of the rail base 2. One gib end 12 is provided with an angulated tip 13 for a purpose hereinafter explained.

The rail anchor 3 before mounting assumes a normal position with the ends 11 and 12 somewhat nearer to the closed loop 4 than after mounting. In applying the rail anchor to the rail, it is inserted transversely beneath the rail base 2 with the straight gib end 11 just engaging one edge of the base and the other end free of the opposite edge, which is the position shown in dotted lines in Fig. I. Subsequently force is applied against the back of the hook portion 9, using an ordinary hammer or sledge if necessary, and this forces the end 11 onto the base 2 of the rail and causes the end 12 to move upwardly to the point where it clears the edge of the rail base. The end 12 will then be in a position where the angulated tip 13 can readily be driven onto the top of the rail base by a blow in the direction opposite from the force first applied. This blow forces the anchor back on the rail base 2 until the loop portion 4 is substantially in the center of the rail or in the position shown in full lines in the drawing.

The rail anchor is readily dismounted in the reverse manner.

In forcing the end 12 of the bar onto the rail base, the angulated tip 13 lifts against the resistance of the bottom loop 4 and the bow spring elements 7 and 8, thus setting up a tightly sprung gripping action on the rail base, the intensity of this gripping action being dependent upon the amount of spring snap between the bar in its free or normal shape and in the shape which it assumes when mounted on the rail base.

It will be noted that the two turns 5 and 6, at the top of the loop 4, are disposed in planes parallel to and equidistant from the common plane through the center of the end hooks 9 and 10, the amount of eccentricity being indicated at $x$. The object of this eccentricity is to afford a bucking leverage, resisting the leverage of the tractive force (the tie load), tending to turn on the rounded gib ends 11 and 12. This eccentricity may, of course, be provided on one or both sides of the central axis of the anchor.

In addition to the normal spring-gripping of the end hooks 9 and 10 on the rail base, the resistance to movement of the anchor along the rail is augmented under tie load compression by the fact that the force on the face of the spring loop 4 will tend to move the central or loop portion, along the rail, while the end hooks 9 and 10 are retained on the rail base by the friction of their grip thereon, thus resolving said force into a transverse component, operative to increase the grip on the top slopes of the rail base.

The rail anchor herein described may be made at comparatively low cost and it is effective and secure in operation. Irrespective of track conditions, the rail anchor is self-retaining on the rail. However, its gripping power is automatically increased in proportion to the imposed loads. Furthermore, by reason of its spring-gripping action, the rail anchor will readily adapt itself to any normal variations of the rail base contour, which may be the result of manufacturing irregularities or service corrosion. The rail anchor may obviously be applied in either direction with respect to the length of the rail.

In Figs. IV, V and VI, there is shown a modified form of rail anchor 3a which is somewhat similar in its characteristics to the one already described. The bar of this rail anchor is made of flat plate stock, and its ends 11a and 12a are made in the form of hooks generally similar to the hooked ends of bar 3 and engaging the top slopes of the base 2 of the rail 1. Intermediate the ends 11a and 12, the bar 3a is longitudinally split to form an elliptical closed loop 4a with a top portion 14 contacting with the bottom of the rail base 2, and a bottom portion 15 including a central slot from which the top portion has been taken, forming a smooth curve between the end hooks 9a and 10a. The end 12a is also provided with an angulated tip 13a to assist the mounting of the rail anchor on the rail.

While we have described two examples or embodiments of our invention, it will be apparent that various changes may be made in the form of the rail anchors herein illustrated without departing from the spirit of our invention as set forth in the claims hereto annexed.

Having thus described our invention, we claim:

1. A rail anchor comprising a bar formed with a closed loop transverse to the longitudinal axis of the rail and contacting with the bottom of the rail base at the central portion thereof, and having ends in the form of hooks spring-gripping the top of the rail base at each side of the rail and curving outward and downward to clear the edges of said rail base and inward to merge with said looped portion.

2. A rail anchor comprising a bar formed with a closed loop with the ends thereof crossing each other and contacting with the bottom of the rail base at the central portion thereof, said loop extending downward in a plane substantially transverse to the axis of the rail, and said bar having its ends in the form of hooks spring-gripping the top of the rail base at each side of the rail, and curving around the rail base clear of the side edges thereof.

3. A rail anchor comprising a bar formed with a closed loop with the ends thereof crossing each other and contacting with the bottom of the rail base at the central portion thereof, said loop extending downward in a plane substantially transverse to the axis of the rail, and said bar having ends in the form of hooks bearing on the top of the rail base at each side of the rail and curving around the rail base clear of the side edges thereof to merge with opposed bow springs spaced from the bottom of the rail base.

4. A rail anchor comprising a bar formed with a closed loop with the ends thereof crossing each other and contacting with the bottom of the rail base at the central portion thereof, and having ends in the form of hooks spring-gripping the top of the rail base at each side of the rail, and curving around the rail base clear of the side edges thereof, a part of said loop in contact with the rail being eccentric to the common plane through the center of the end hooks.

5. A rail anchor comprising a bar formed with a closed loop with the ends thereof crossing each other and contacting with the bottom of the rail base at the central portion thereof, and having ends in the form of hooks spring-gripping the top of the rail base at each side of the rail, and curving around the base clear of the side edges thereof, the crossed ends of said loop being disposed in planes parallel to and equidistant from the common plane through the center of the end hooks at each side thereof.

6. A rail anchor comprising a bar split to form a closed loop contacting with the bottom of the rail base and having ends in the form of hooks spring-gripping the top of the rail base at each side of the rail.

7. A rail anchor comprising a bar having a portion intermediate the ends thereof longitudinally split to form a spring loop contacting with the bottom of the rail base and having the ends curved around the edges of the rail base and gripped to the top of the rail base by said spring loop.

8. A rail anchor comprising a bar made of flat plate stock having a portion intermediate the ends thereof longitudinally split to form a spring loop, one part of said loop having a central slot and the other part comprising the portion of the bar split from said first part, and having the ends curved around the edges of the rail base and gripped to the top of the rail base by said spring loop.

9. A rail anchor comprising a bar longitudinally split to form an elliptical closed loop contacting with the bottom of the rail base at the center thereof and having ends in the form of hooks spring-gripping the top of the rail base at each side of the rail.

10. A rail anchor comprising a bar, formed with a closed loop, contacting with the bottom of the rail base only at the central portion thereof, and having ends in the form of hooks spring-gripping the top of the rail base at each side of the rail, said bar having an angulated tip at one end to permit the same more readily to pass over the edge of the rail base when the bar is applied, and said bar being otherwise symmetrical throughout its length.

11. A rail anchor comprising a bar, formed with a closed loop transverse to the longitudinal axis of the rail, contacting with the bottom of the rail base only at the central portion thereof, and having ends in the form of hooks spring-gripping the top of the rail base at each side of the rail, said bar having an angulated tip at one end to permit the same more readily to pass over the edge of the rail base when the bar is applied, and said bar being otherwise symmetrical throughout its length.

12. A rail anchor comprising a bar formed with a closed loop transverse to the longitudinal axis of the rail and contacting with the bottom of the rail base only at the central portion thereof, and having similarly shaped ends in the form of hooks spring-gripping the top slopes of the rail base at each side of the rail and engaging said top slopes with line contacts in a common plane transverse to the rail.

13. A rail anchor comprising a bar formed with a closed loop transverse to the longitudinal axis of the rail and affording a plurality of points contacting with the bottom of the rail base only at the central portion thereof and having ends in the form of hooks spring-gripping the top of the rail base at each side of the rail, the axes of said ends lying in a common plane transverse to the rail intersecting the line connecting the points of contact between said loop and the bottom of the rail base.

14. A rail anchor comprising a bar having a loop extending downwardly from the central portion of the rail base and having ends in the form of hooks extending over the top of the rail base spring-gripping the latter adjacent opposite sides thereof, said hooks curving around the rail base clear of the side edges thereof and extending beneath said base in spaced relation thereto to form bow springs, the inner ends of said bow springs merging with said loop and being in engagement with the under side of the rail base.

15. A rail anchor comprising a bar having oppositely extending spring elements engageable adjacent their inner ends with the under side of the base of the rail and respectively extending outwardly and downwardly from the latter, and a loop connecting the inner ends of said spring elements projecting downwardly from the central portion of the rail base, the outer ends of said spring elements terminating in hooks spaced from the bottom and side edges of the rail base and spring-gripping portions of the top of the rail base disposed in a common plane substantially normal to the longitudinal axis of the rail, the inner end of at least one of said spring elements being laterally offset from said plane.

16. A rail anchor comprising a bar having oppositely extending spring elements engageable adjacent their inner ends with the under side of the base of the rail and respectively extending downwardly and outwardly from the latter, and a loop connecting the inner ends of said spring elements projecting downwardly from the central portion of the rail and having a portion for engaging a rail tie, the outer ends of said spring elements terminating in hooks spaced from the bottom and side edges of the rail base and spring-gripping the top of the rail base adjacent opposite sides thereof in a common plane transverse to the rail, the inner end at least of one of said spring elements being offset longitudinally of the rail from said common plane and from said tie engaging portion of the loop.

17. A rail anchor comprising a bar having a loop adapted to extend downwardly from the central portion of the base of the rail and having spring elements extending in opposite directions from the loop respectively engageable with the rail base adjacent their inner ends, said spring elements extending downwardly and outwardly from the rail base and curving around the latter in spaced relation to the bottom and side edges thereof to form hooks spring-gripping the top of the rail base in a common plane transverse to the rail, said loop having a tie engaging portion disposed on one side of said common plane and the inner end of one of said spring elements being disposed on the opposite side of said plane.

K. E. HOFAMMANN.
LOUIS H. SCHLATTER.